Nov. 10, 1964     S. GODEL     3,156,835
BIDIRECTIONAL STEPPING MOTOR

Filed Feb. 14, 1961     3 Sheets-Sheet 1

INVENTOR.
SIEGFRIED GODEL
BY Arnold and Roylance
ATTORNEYS

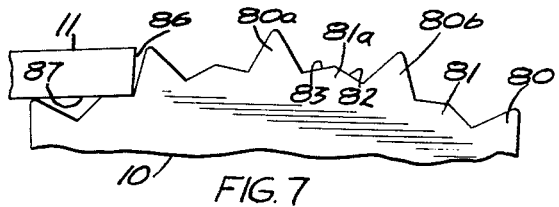
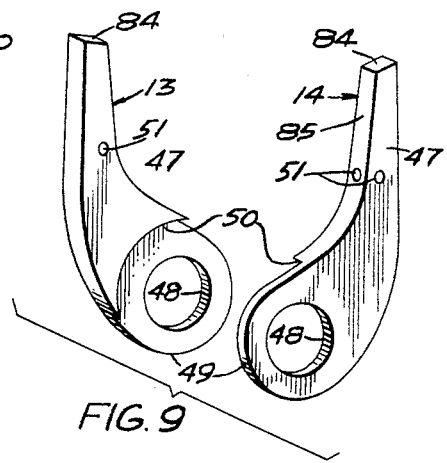
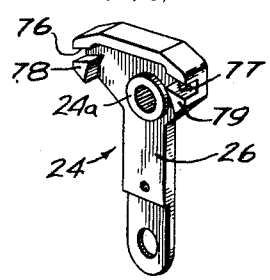
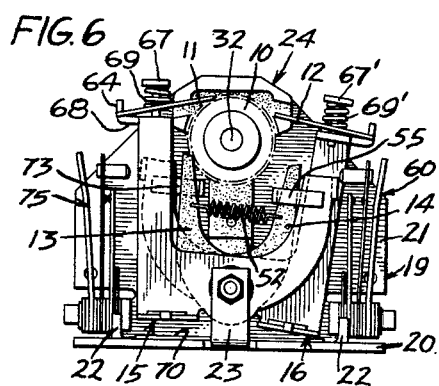
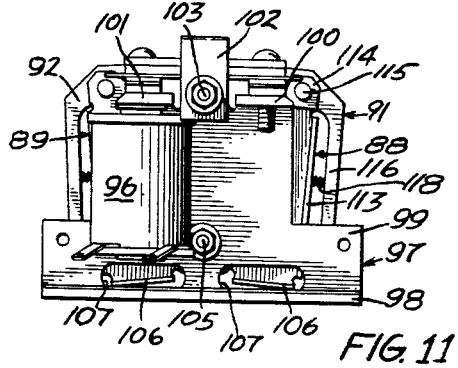
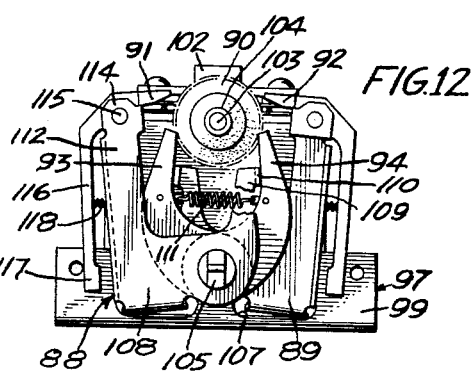
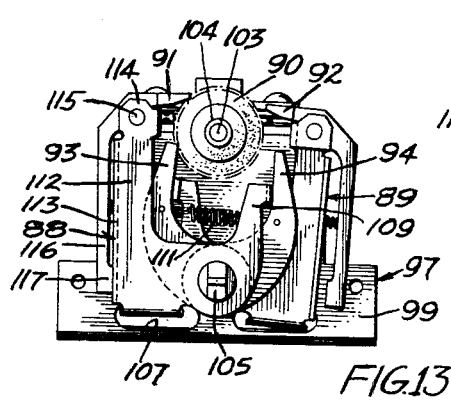

Nov. 10, 1964  S. GODEL  3,156,835
BIDIRECTIONAL STEPPING MOTOR
Filed Feb. 14, 1961  3 Sheets-Sheet 3

INVENTOR.
SIEGFRIED GODEL
BY
Arnold and Roylance
ATTORNEYS

United States Patent Office 3,156,835
Patented Nov. 10, 1964

3,156,835
BIDIRECTIONAL STEPPING MOTOR
Siegfried Godel, Norwalk, Conn., assignor to American Machine & Foundry Company, a corporation of New Jersey
Filed Feb. 14, 1961, Ser. No. 89,247
24 Claims. (Cl. 310—22)

This invention relates to stepping devices, and more particularly to stepping motors of the type adapted to reversibly rotate an output shaft through successive positions. While not limited thereto, this invention is particularly useful in actuating high speed stepping relays, switches, servo-mechanisms, computing devices and the like.

In its usual form, a stepping motor is one which drives elements, such as the contacts of a stepping switch, through successive positions upon repeated application of pulses to the motor. While many stepping motors are satisfactory for low speed operation, they are unsatisfactory for high speed operation primarily because they require excessive operating power and because the increased inertia of the moving parts, during high speed operation, causes the mechanism to jam or to overshoot. Other reasons why many stepping motors are unsatisfactory are because such motors operate at a high audible noise level, are difficult to adjust for proper operation and are not compact.

Accordingly, one of the objects of this invention is to provide an improved stepping motor which can be operated successfully at high speeds as well as at low speeds.

Another object is to provide an improved stepping motor, capable of both high speed and low speed operation, wherein the output shaft or like driven element is driven through successive, predetermined angular increments which are the same during both high speed and low speed operation, and wherein overshooting is avoided.

A further object is to devise a stepping motor capable of unusually high speed operation.

Another object is to provide an improved stepping motor which requires less operating power and has lower power losses than have prior-art stepping motors.

Still another object is to provide an improved stepper motor which will not jam when operated at high speeds.

Other objects of this invention are to provide an improved stepper motor which is compact, does not require adjusting, operates at a low audible noise level, is inexpensive to construct and has great utility.

In order that the manner in which these and other objects are attained in accordance with the invention can be understood in detail, reference is had to the accompanying drawings, which form a part of this specification, and wherein:

FIG. 6 is an elevational view, similar to FIG. 2, illustrating some parts in their actuated position;

FIG. 7 is a view illustrating the ratchet wheel tooth profile;

FIG. 8 is a perspective view of the stop member of the embodiment of FIG. 1;

FIG. 9 is an exploded perspective view illustrating details of the detent pawls of the embodiment of FIG. 1;

FIG. 11 is a rear elevational view, with an electromagnet removed, of another embodiment of the invention;

FIG. 12 is a front end elevational view of the embodiment of FIG. 11, with portions broken away, and illustrating all elements in their unactuated positions;

FIG. 13 is a view similar to FIG. 12 illustrating some of the elements in their actuated positions;

Figure 17:
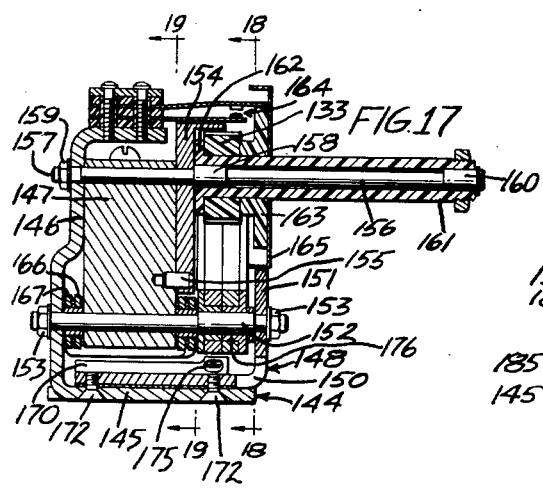
Figure 19:
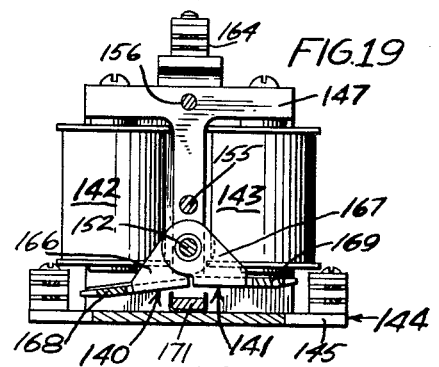
Figure 18:
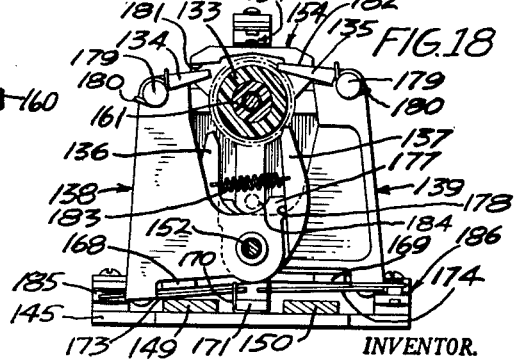

FIG. 17 is a longitudinal sectional view of another embodiment of the invention; and FIGS. 18 and 19 are transverse elevational views along lines 18—18 and 19—19, respectively, of FIG. 17.

Referring now to the drawings in detail, the embodiment of the invention illustrated in FIGS. 1–10 comprises a ratchet wheel 10, a pair of driving pawls 11 and 12, a pair of detent pawls 13 and 14, a pair of armatures 15 and 16, and a pair of electromagnets 17 and 18 mounted in substantial bilateral symmetry on a support bracket 19.

Support bracket 19 includes a horizontal base 20, a flat upright portion 21 which extends upwardly from the rear of base 20, a pair of lugs 22 located one on each side of base 20 in front of portion 21, and an arm or support 23 struck out of base 20 and extending upwardly in front of and parallel to upright portion 21.

A stop member 24 is secured to support bracket 19 by a screw 25. Stop member 24 includes a flat body 26 (FIGS. 3 and 8) which abuts the front face of portion 21. The lower portion of body 26 lies directly in back of support 23, and portion 21, body 26 and support 23 have aligned apertures accommodating a pivot pin 27. Pivot pin 27 includes a slotted head 28 (FIG. 3) which abuts the rear face of portion 21 and a threaded end which projects in front of support 23 and carries a nut 29 (FIGS. 1 and 3) which secures pivot pin 27 in place.

Figure 3:
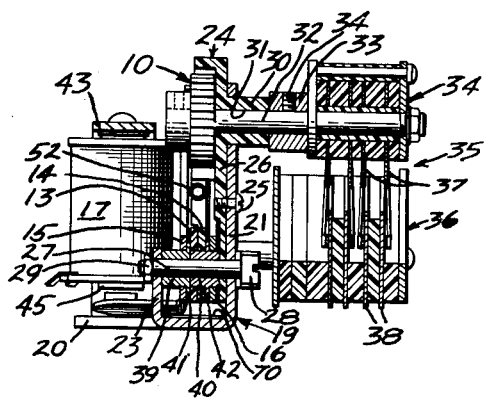
FIG. 3 is a longitudinal elevational view, partly in section, taken on line 3—3, FIG. 1.

Stop member 24 includes a cylindrical portion 30 (FIGS. 3 and 4) which extends rearwardly of body 26 through an aperture suitably formed in portion 21. As illustrated in FIG. 3, portion 30 has a longitudinal bore 31 through which an output shaft 32 extends, the walls of bore 31 providing suitable bearing support so that the output shaft 32 can rotate relative thereto. Ratchet wheel 10 is connected to the front end of output shaft 32, as by means of a set screw, for rotating the shaft. The shaft is secured against longitudinal sliding movement by a sleeve 33 which is secured to shaft 32 by a set screw 34 and which abuts the rear face of portion 30. Since the rear face of ratchet wheel 10 abuts the front face of body 26 of stop member 24, the shaft cannot move longitudinally.

The rear end of output shaft 32 supports the movable contact assembly 34 of a switch indicated generally by reference numeral 35. Switch 35 also includes a stationary contact assembly 36 supported on support bracket 19 and extending rearwardly from portion 21. Movable contact assembly 34 includes a plurality of axially spaced wiping arms 37 which extend generally radially outwardly from output shaft 32 and cooperate with a plurality of angularly spaced stationary contacts 38 arranged so that, when the stepping motor is actuated in a manner described hereafter, each wiping arm is moved into successive engagement with the associated stationary contacts. The angle between adjacent stationary contacts is substantially equal to the angle through which the ratchet wheel 10 is rotated between successive positions.

As best seen in FIG. 3, a pair of sleeves 39 and 40 are rotatably supported on pivot pin 27 and extend between the rear face of support 23 and the front face of body 26. The rear end of sleeve 39 abuts the front end of sleeve 40 and has a transverse flange 41. At a point intermediate its ends, sleeve 40 has a transverse flange 42. Armature 15 is secured to sleeve 39, as by means of a press fit, and abuts flange 39. Similarly, armature 16 is fixedly mounted on sleeve 40, as by means of a press fit, and abuts the rear face of flange 42. Detent pawls 13 and 14 are mounted on sleeve 40 and lie between flanges 41 and 42, the detent pawls being rotatable relative to the sleeves and relative to each other. The lower end of body 26 of stop member 24 is reduced in thickness to provide operational clearance for armature 16.

An inverted U-shaped support bracket 43 has its ends connected to lugs 22, as by screw means or rivets. Electromagnets 17 and 18 are secured to the cross bar of support bracket 43 and extend downwardly in parallel relation toward base 20 on opposite sides of the longitudinal center line of the stepper motor.

Each of electromagnets 17 and 18 is of conventional construction and is provided with a pair of input terminals 44 (FIG. 4) to which leads are connected for selectively supplying suitable energizing current to either of the electromagnets. Further electromagnets 17 and 18 have exposed poles 45 and 46, respectively, toward which armatures 15 and 16 are attracted, respectively, in response to selective energization of the electromagnets. Poles 45 and 46 are spaced above base 20 to provide clearance for movement of the armatures.

Detent pawls 13 and 14 are identical and are arranged in substantial bilateral symmetry on pivot pin 27. As best seen in FIG. 9, each detent pawl comprises a flat body portion 47 the lower end of which is one-half the thickness of the upper portion so that when both detent pawls are mounted on sleeve 40, the lower portions occupy an axial space equal to the thickness of the upper portion of the body of either of the detent members. Thus, flanges 41 and 42 are axially spaced a distance substantially equal to the thickness of the upper portion of body 47.

Each detent pawl has an aperture 48 of slightly greater diameter than the outer diameter of sleeve 40 so that the detent pawls can rotate relative thereto. The peripheral portion of the lower end of body 47 is rounded as indicated at 49. Body 47 also includes an arcuate shoulder 50 having a radius of curvature slightly greater than that of the rounded end of the body so that detent pawls 13 and 14 can rotate relative to each other.

Figure 1:
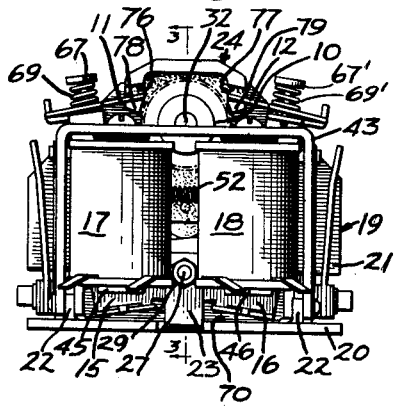
FIG. 1 is a front elevational view of one embodiment of the invention.
Figure 2:
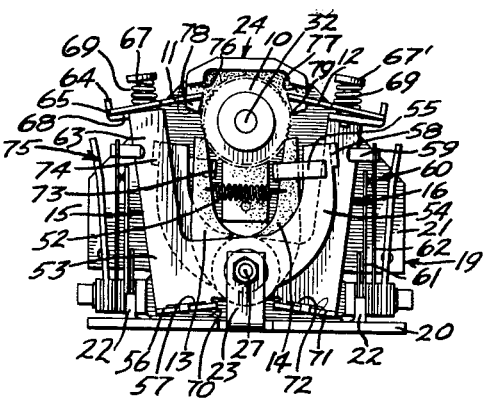
FIG. 2 is a front elevational view, similar to FIG. 1, with portions removed.

As viewed in FIG. 2, detent pawl 13 extends radially and upwardly to the left of pivot pin 27 and is engageable with the lower left quadrant of ratchet wheel 10 to prevent counterclockwise rotation of the ratchet wheel. Similarly, detent pawl 14 extends radially and upwardly from pivot pin 27 and is engageable with the lower right quadrant of ratchet wheel 10 to prevent clockwise rotation of the ratchet wheel. Each of detent pawls 13 and 14 is provided with suitable apertures 51 by means of which the ends of a helical tension spring 52 are fastened to the detent pawls. Spring 52 extends below ratchet wheel 10 and is operative to bias detent pawls 13 and 14 toward each other and into engagement with the ratchet wheel.

As best seen in FIG. 2, armature 15 is a lever and includes a flat body 53 which lies in a plane perpendicular to the axis of rotation of ratchet wheel 10 and to the axis of pivot pin 27. Body 53 is irregularly shaped and includes a leg 54 which extends to the right of pivot pin 27 and upwardly. An L-shaped member 55 is connected to the upper end of leg 54 and extends inwardly therefrom, the inner leg of member 55 being engaged with the inner face of detent pawl 14 so that spring 52 biases armature 15 away from its actuated position toward the position shown in FIG. 2. Armature 15 also includes an arm 56 which extends forwardly of body 53 at the lower left portion thereof and lies between base 20 and pole 45 of electromagnet 17. A non-magnetic shim 57 covers a portion of the upper face of arm 56 and when armature 15 is attracted by electromagnet 17, shim 57 lies between arm 56 and pole 45 to prevent armature 15 from sticking due to residual magnetism.

A tab 58 is connected to the upper portion of leg 54 toward the outside edge thereof and is engageable with an actuator 59 of an interrupter switch indicated generally by reference numeral 60.

The interrupter switch includes a stationary contact arm 61 and a movable contact arm 62 which extends upwardly beyond the upper end of contact arm 61 and carries the actuator. Movable contact arm 62 is normally closed, that is, it normally engages contact arm 61, but upon movement of armature 15 into its unactuated position, tab 58 moves actuator 59 and movable contact arm 62 to break electrical contact between contact arms 61 and 62.

Body 53 of armature 15 also includes a leg 63 which, as viewed in FIG. 2, extends upwardly and terminates to the left of ratchet wheel 10. A flange 68 extends perependicular to and rearwardly of body 47 and carries an upwardly projecting lug 64.

Driving pawl 11 is mounted on armature 15 for movement therewith and comprises a pair of ears 65 which straddle lug 64 to prevent lateral movement of pawl 11 relative to armature 15. The edge of pawl 11 extending between ears 65 is rounded and abuts lug 64 to form a pivot about which pawl 11 rotates relative to armature 15. Driving pawl 11 is provided with a slot 66 (FIG. 4) through which a stud 67 extends, the lower end of stud 67 being threadably received in a threaded aperture suitably formed in the flange 68. A helical compression spring 69 is disposed between the head of stud 67 and the upper surface of driving pawl 11 and biases driving pawl 11 clockwise about its pivotal axis, which is parallel to the axis of ratchet wheel 10, toward flush engagement with flange 64.

A shim 70 is affixed to and extends transversely over a portion of the upper surface of base 20 and serves as a stop member defining the unactuated positions of armatures 15 and 16. Shim 70 is arranged to engage the bottom surface of arm 56 when armature 15 is moved under the influence of spring 52 when detent pawl 14 engages ratchet wheel 10.

Armature 16 is similar to armature 15 and comprises an arm 71, covered by a non-magnetic shim 72, which is attracted toward engagement with pole 46 upon energization of electromagnet 18. Armature 16 is coupled to detent pawl 13 by an L-shaped member 73 and has a tab 74 arranged to actuate an interrupter switch 75. Driving pawl 12 is mounted upon armature 16, similar to the manner in which pawl 11 is mounted on armature 15, by a stud 67' and a spring 69'.

Stop member 24 includes a pair of laterally spaced stops 76 and 77 and a pair of laterally spaced guides 78 and 79 which project forwardly of body 26. Guide 78 is adjacent to stop 76 but is spaced therefrom, whereas guide 79 is adjacent to and spaced from stop 77. Driving pawl 11 extends between guide 78 and stop 76 and driving pawl 12 extends between guide 78 and stop 77. When armatures 15 and 16 are unactuated, as seen in FIG. 2, driving pawls 11 and 12 are biased into engagement with guides 78 and 79, respectively by springs 69 and 69'. Stop member 24 can be provided with an annulus 24a which fits into a groove in the ratchet wheel, or the annulus and groove can be dispensed with.

Guides 78 and 79 are arranged to guide movement of driving pawls 11 and 12, upon actuation of armatures 17 and 18, respectively, into engagement with ratchet wheel 10, in a manner described hereafter, for rotating ratchet wheel 10 in clockwise and counterclockwise directions, respectively. Stops 76 and 77 are arranged to engage driving pawls 11 and 12, respectively, when the driving pawls have rotated ratchet wheel 10 through a fixed angular increment equal to the angular spacing between adjacent major teeth.

Ratchet wheel 10 has a cylindrical body portion having a plurality of teeth spaced about the periphery thereof, and a cylindrical hub of reduced diameter. The teeth of ratchet wheel 10 are of two types; major teeth indicated by reference numeral 80, and minor teeth indicated by reference numeral 81, in FIGS. 7 and 10. The teeth are evenly spaced about ratchet wheel 10, there being one minor tooth between each pair of adjacent major teeth. Each tooth projects radially outwardly from ratchet wheel 10 and has flat side surfaces lying in planes which intersect at an apex such that a radial line passing through the apex bisects the angle between the side surfaces. The planes in which the side surfaces lie are parallel to the axis of rotation of the ratchet wheel so that the teeth also can be considered parallel to the axis.

Figure 10:
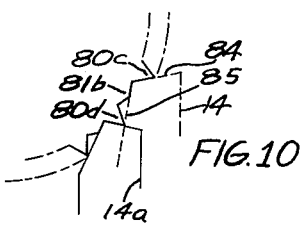
FIG. 10 is a schematic view illustrating the construction of one of the detent pawls, and an alternate embodiment thereof, of the device of FIG. 1, FIGS. 7-10 being enlarged, relative to the remaining views, for clarity.
Figures 4, 5:
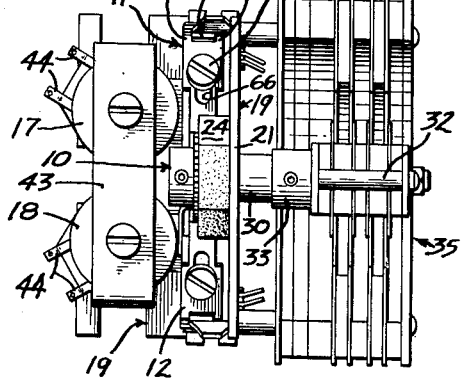
FIG. 4 is a top plan view of the embodiment of FIG. 1.
FIG. 5 is a rear elevational view of the embodiment of FIG. 1.
Figure 14:
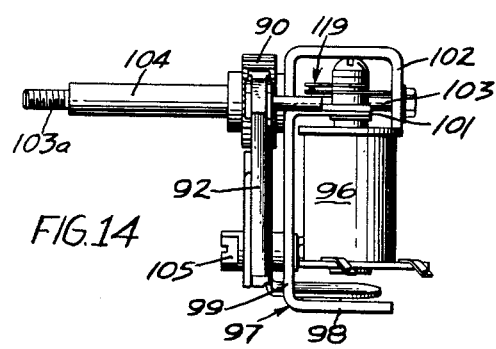
FIGS. 14 and 15 are side elevational and top plan views of the embodiment of FIG. 11.
Figure 15:
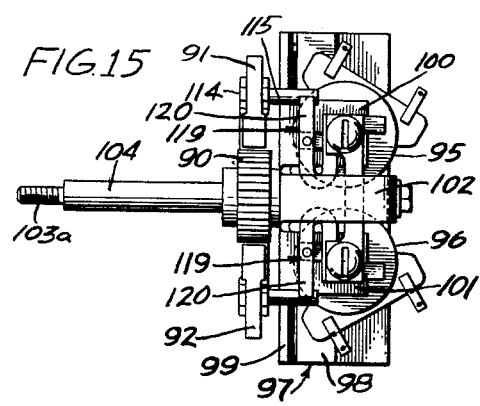

The radial distance to the apex of each minor tooth 81 is less than the radial distance to a chord extending between the apexes of the adjacent major teeth. Each of the side surfaces of each minor tooth lies in a plane which passes through the apex of the major tooth adjacent the other side of the minor tooth. Thus, by way of example, and with reference to FIG. 7, minor tooth 81a is between major teeth 80a and 80b and has flat side surfaces 82 and 83 which lie in planes passing through the apexes of major teeth 80a and 80b, respectively. The apex of each major tooth can be pointed, as illustrated in FIG. 10, or can be rounded, as illustrated in FIG. 7, to provide operational clearance.

As previously indicated, detent pawls 13 and 14 are identical. With reference to the schematic illustration of FIG. 10, detent pawl 14, indicated by the dotted lines, has a flat end face 84 which, when the detent pawl is engaged with ratchet wheel 10, lies flush with the lower side face of major tooth 80c. Detent pawl 14 also includes a flat side face 85 which intersects face 84 at an angle substantially equal to the angle between the intersecting sides of adjacent major and minor teeth so that when detent pawl 14 engages ratchet wheel 10, side face 85 lies flush with the upper face of minor tooth 81b and abuts the apex of major tooth 80d. The angle between the sides of adjacent teeth depends upon the number of teeth on ratchet wheel 10. In the arrangement illustrated, the spacing of the major and minor teeth corresponds to that which occurs when ratchet wheel 10 is provided with approximately twenty-two major teeth and twenty-two minor teeth. It will be understood, of course, that the ratchet wheel can be provided with a greater number or lesser number of teeth, dependent upon the number of successive positions or angular spacing of such positions, of the stepping motor.

With the arrangement thus far described, detent pawls 13 and 14 are operative to prevent rotation of ratchet wheel 10 only under the conditions normally encountered during operation of the stepping motor. The arrangement illustrated is such that application of an excessive torque to ratchet wheel 10, as by manual rotation thereof, can cause the detent action of pawls 13 and 14 to be overcome. That is, a sufficiently large torque generates a force which overcomes the frictional forces and the force due to spring 52 and thereby moves the detent pawls away from the ratchet wheel so that it can be rotated. In order to prevent this, the detent pawls can be arranged so that the application of an excessive torque applied to ratchet wheel 10, when the detent pawls are engaged therewith, tends to rotate the detent pawls toward the center of the ratchet wheel, as opposed to rotating them away from the ratchet wheel. With the arrangement illustrated, this can be done by arranging the detent pawls to engage the next lower major tooth. Thus, with reference to FIG. 4, detent pawl 14a engages the lower side of major tooth 80d, so that the static forces due to a clockwise torque tend to rotate pawl 14a toward the center of ratchet wheel 10; but, since ratchet wheel 10 is rigid, the detent pawl cannot move and therefore the ratchet wheel 10 cannot be rotated in a clockwise direction. Detent pawl 13 can be arranged in a similar fashion to positively prevent rotation of the ratchet wheel in a counterclockwise direction.

As illustrated in FIG. 7 with reference to driving pawl 11, each driving pawl has a flat end face 86 which, when the driving pawl moves into engagement with ratchet wheel 10, lies flush with the major tooth engaged therewith. Each pawl also has a flat bottom face 87 which, when the driving pawl is fully actuated, lies flush with the face of the minor tooth engaged therewith and tangential to the apex of the succeeding major tooth. The angle between faces 86 and 87 is equal to the angle between adjacent side faces of a major and minor tooth less the angle through which the driving pawl pivots relative to the ratchet wheel as the ratchet wheel is moved between adjacent positions. When pawl 11 rotates the ratchet wheel, the pawl pivots relative to the ratchet wheel about an axis which lies generally at the intersection of the side surfaces of the major and minor teeth engaged therewith.

In operation, when neither electromagnet 17 nor electromagnet 18 is energized, the movable elements are in their unactuated positions, as illustrated in FIG. 2. In such positions, spring 52 biases detent pawls 13 and 14 into engagement with ratchet wheel 10 to prevent rotation of the ratchet wheel in either direction. Spring 52, acting through the detent pawls and through members 55 and 73, also biases armatures 14 and 15 toward their unactuated positions and in engagement with shim 70. Consequently, driving pawls 11 and 12 abut guides 78 and 79, the guides being spaced to provide suitable clearance for rotation of ratchet wheel 10. Both interrupter switches 60 and 75 are open.

When either of electromagnets 17 or 18 is energized, the parts move in a similar fashion except the end result is slightly different. Operation of electromagnet 17 causes ratchet wheel 10 to be rotated in a clockwise direction, as viewed in FIG. 1, and energization of electromagnet 18 causes ratchet wheel 10 to be rotated in a counterclockwise direction. When electromagnet 17 is energized, it attracts armature 15 and moves armature 15 from its unactuated position, shown in FIG. 2, to its actuated position, shown in FIG. 6. As the armature moves from its unactuated position and rotates clockwise, member 55 pulls detent pawl 14 from engagement with ratchet wheel 10 and against the bias of spring 52 to allow clockwise rotation of the ratchet wheel. Further, as the armature 15 begins to rotate toward its actuated position, driving pawl 11 slides over guide 78 and moves into engagement with the rear face of the major tooth aligned in the path of movement of the free end of the pawl. Pawl 11 engages the ratchet wheel at the same time as, or shortly after, detent pawl 14 is disengaged from the ratchet wheel. Continued movement of armature 15 causes pawl 11 to rotate ratchet wheel 10 in a clockwise direction.

As ratchet wheel 10 rotates, pawl 11 is lifted from engagement with guide 78 and moves toward stop 76. Ratchet wheel 10 continues to rotate until pawl 11 engages stop 76. When this happens, the leading face of the minor tooth immediately under driving pawl 11 lies flush with the pawl so that further actuating movement of armature 15 and pawl 11 is prevented. In the fully actuated position, the torque exerted on ratchet wheel 10 by pawl 11 due to energization of electromagnet 17 or to the inertia of the parts, causes the leading face of the engaged minor tooth to tend to rotate driving lever 11 relative to armature 17. However, since stop 76 engages pawl 11, such rotation is prevented. Therefore, the parts cannot move beyond this position and any overshooting is prevented.

As ratchet wheel 10 is rotated, one of the major teeth engages side 85 of detent pawl 13 and cams it outwardly until this tooth passes by the end surface at which time spring 52 pivots detent pawl 13 into operative engagement with ratchet wheel 10 to preevnt rotation in the counterclockwise diretcion. The parts are arranged so that detent pawl 13 moves into this position at the same time as, or slightly before, driving pawl 11 engages stop 76.

When electromagnet 17 is de-energized, spring 52 moves detent pawl 14 into engagement with ratchet wheel 10. As the detent pawl 14 moves, it pulls member 55 and rotates armature 15 in a counterclockwise direction, as viewed in FIG. 2, into its unactuated position. When driving pawl 11 begins to move toward its unactuated position, it exerts a slight frictional torque on ratchet wheel 10 which tends to rotate in a counterclockwise direction. But, since detent pawl 13 is in operative engagement with the ratchet wheel 10, such rotation is prevented. Further, movement of driving pawl 11 from its fully actuated position causes spring 69 to move pawl 11 from engagement with stop 76 into engagement with guide 78. Subsequent energization and the energization of electromagnet 17 repeat this cycle so that ratchet wheel 10 is rotated stepwise, through equal increments, in a clockwise direction.

As previously indicated, when electromagnet 18 is energized and de-energized, the parts are moved in directions similar to, but opposite from, that just described, so that ratchet wheel 10 is rotated stepwise, through equal increments, in a counterclockwise direction.

The embodiment illustrated in FIGS. 11–15 generally comprises a pair of armatures 88 and 89, a ratchet wheel 90, a pair of driving pawls 91 and 92, a pair of detent pawls 93 and 94, and a pair of electromagnets 95 and 96 mounted on a support bracket 97. The ratchet wheel, electromagnets and driving pawls are substantially identical with those of the first embodiment. The support bracket comprises a horizontal base 98 which extends rearwardly from the bottom of an upright portion 99. A pair of laterally spaced arms 100 and 101 extend rearwardly from the upper edge of portion 99 and support electromagnets 95 and 96 in a parallel depending fashion. Support bracket 97 also includes an inverted U-shaped arm 102 at the upper center of upright portion 99. A stationary shaft or axle 103 extends through aligned apertures suitably formed in the legs of arm 102, the axle being secured against axial movement relative to the support bracket in any suitable fashion. Ratchet wheel 90 is mounted for rotation about axle 103 and is integral with a tubular output shaft 104 which also fits over and is rotatably supported by the axle. The ratchet wheel and output shaft can be secured against axial movement by connecting a nut to threaded end 103a of the axle, which end projects beyond the adjacent end of the shaft.

Detent pawls 93 and 94 and armatures 88 and 89 are rotatably supported on a pivot pin 105 secured to upright portion 99, the pivot pin being parallel to ratchet wheel 90 and shaft 104. Each armature has an arm 106 which extends through an aperture 107 formed in support bracket 97, and which lies between the pole of the electromagnet associated therewith and base 98 so that actuation of electromagnet 95 actuates armature 88 and actuation of electromagnet 96 actuates armature 89.

Armature 88 includes a flat body portion 108 which lies in a plane perpendicular to the axis of ratchet wheel 90 and pivot pin 105. Armature 88 also includes a leg 109 which extends upwardly to the right of pivot pin 105, as illustrated in FIG. 13, and which is bent at its upper end and provided with a tab 110 engaging the left side of detent pawl 94. In contrast to the first embodiment, leg 109 pushes the detent pawl. A spring 111 is connected at opposite ends to a pair of pins which in turn are connected to detent pawls 93 and 94 and biases the detent pawls and armatures toward their unactuated positions. Body 108 also includes a leg 112 which extends upwardly to the left of pivot pin 105, as viewed in FIG. 12. A flange 113 extends perpendicularly and rearwardly of leg 112 at its outside edge. The upper end of leg 112 has a U-shaped portion 114, the legs of which are suitably apertured to support a pivot pin 115 on which driving pawl 91 is mounted for pivotal movement about an axis parallel to that of ratchet wheel 90.

Driving pawl 91 is provided with an arm 116 which extends to the left of pivot pin 115, as viewed in FIG. 12, and downwardly substantially parallel to flange 113. At its lower end, arm 116 is provided with a head 117 engageable with flange 113. A compression spring 118 biases driving pawl 91 in a clockwise direction relative to armature 88 so that head 117 is normally spaced from flange 113, and pawl 91 engages the upper surface of the cross bar of portion 114, the cross bar being parallel to pivot pin 115. Thus, the free end of the driving pawl 91 is supported so that when it is moved to its actuated position it will engage the major tooth aligned therewith.

A pair of interrupter switches 119, 119 are mounted on top of arms 100 and 101 and are each provided with a normally closed movable contact arm 120. Pivot pin 115 extends rearwardly from portion 114 and engages movable contact arm 120, when an armature moves into its actuated position, to open the switch associated therewith.

The operation of this embodiment is very similar to that of the first embodiment. When electromagnet 95 is energized, it attracts armature 88 and thereby disengages detent pawl 94 to allow clockwise rotation of the ratchet wheel. As the amature is pivoted toward its fully actuated position, driving pawl 91 moves into engagement with and rotates the ratchet wheel. As the ratchet wheel rotates, it pivots driving pawl 91 relative to armature 88 until head 117 abuts flange 113. The head and flange are arranged so that they abut after the ratchet wheel has rotated through an angular increment corresponding to the angular spacing between adjacent major teeth. Rotation of the ratchet wheel also cams detent pawl 93 until the pawl can snap back into operative engagement with the ratchet wheel.

When fully actuated, the bottom surface of driving pawl 91 lies flush with the leading side edge of the minor tooth engaged therewith and tangential to the apex of the succeeding major tooth. De-energization of electromagnet 95 allows spring 111 to move the armature 88 and detent pawl 14 to their unactuated position. In a similar manner, actuation of electromagnet 96 causes the ratchet wheel to be rotated in a counterclockwise direction.

Figure 16:
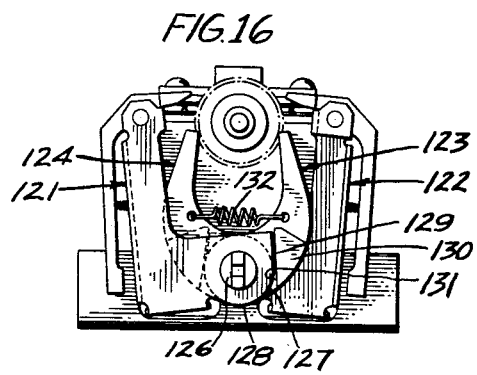
FIG. 16 is a front elevational view of another embodiment of the invention.

The embodiment illustrated in FIG. 16 is similar to that shown in FIGS. 11–15 except for the structure of the coupling between the armatures and the detent pawls. The embodiment of FIG. 16 includes a pair of armatures 121 and 122 similarly coupled to a pair of detent pawls 123 and 124, respectively. Each armature includes a flat body portion which terminates, on a different side of a pivot pin 126, in an edge 127. The lower portion 128 of edge 127 is curved and is concentric to the axis of pivot pin 126. Edge 127 also includes a straight upper portion 129 which is tangential to the lower portion. Each detent pawl includes an abutment 130 having a straight edge 131. A helical tension spring 132 biases the detent pawls toward the ratchet wheel. Detent pawl 123 is mounted so that the straight edge 131 thereof normally abuts straight edge 129 of armature 121 so that tension spring 132 biases detent pawl 123 and armature 121 in a clockwise direction. Similarly, detent pawl 124 and armature 122 are biased in a counterclockwise direction by spring 132. Because the lower portions 128 are rounded, each detent pawl can rotate relative to its associated armature when the ratchet wheel is rotated in a direction opposite to that which the detent pawl prevents. Actuation of armature 121 disengages detent pawl 123 and allows the ratchet wheel to be rotated clockwise and actuation of armature 122 disengages detent pawl 124 to allow counterclockwise rotation of the ratchet wheel.

The embodiment illustrated in FIGS. 17–19 includes a ratchet wheel 133, a pair of driving pawls 134 and 135, a pair of detent pawls 136 and 137, a pair of levers 138 and 139, a pair of armatures 140 and 141 and a pair of electromagnets 142 and 143 mounted on a support bracket 144.

Support bracket 144 includes a horizontal base 145 and an upright portion 146 which extends upwardly at the rear of base 145. A T-shaped field member 147, of magnetic material, is secured to portion 146 and has a horizontal cross bar which supports electromagnets 142 and 143 in front of portion 146 in parallel dependent fashion. The vertical leg of member 147 extends between the electromagnets and terminates at its lower end in approximately the same plane as that of the poles of the electromagnets. Field member 147 provides a low reluctance magnetic path.

A support member 148 has a pair of laterally spaced legs 149 and 150 secured to base 145 and a transverse cross bar 151 above the legs. A pivot pin 152 is secured at opposite ends to bar 151 and portion 146, by means of a pair of nuts 153, and extends through an aperture suitably formed in field member 147.

A stop member 154 is secured to the front of field member 147 by a dowel pin 155. An axle 156 extends through field member 147 and stop member 154 parallel to and above pin 152 and has a threaded end portion 157 and an enlarged medial portion 158 which abuts the front of stop member 154. A nut 159, tightened on threaded end 157 draws the medial portion 158 toward upright portion 146. Axle 156 extends forwardly of stop member 154 and terminates in an end of enlarged diameter 160. A tubular output shaft 161 is rotatably supported on axle 156, the inner bore of the shaft being approximately the same as the outer diameters of portions 158 and 160 so that the shaft is supported at two axially spaced points. Shaft 161 is threaded at its outer end to receive a nut for attaching the output shaft to some device, such as a switch, which is to be operated by the stepping motor, and has a flange 162 at its inner end which abuts stop member 154. Ratchet wheel 133 is supported on output shaft 161 and abuts the flange 162, the ratchet wheel being secured to the shaft as by means of a press fit for rotation therewith. A switch actuator 163 is also secured to shaft 161, in front of the ratchet wheel and actuates a switch 164 mounted on top of support bracket 144. An indicator plate 165 is mounted on shaft 161 in front of the switch actuator 163.

Armature 140 is provided with a pair of legs 166 which straddle member 147 and are mounted for pivotal movement about pin 152. Similarly, armature 141 is provided with a pair of legs 167 which are mounted for pivotal movement on pin 152 and which straddle legs 166, there being a pair of bushings between legs 166 and 167 and pin 152. Portion 146 is recessed adjacent the lower end of member 147 to provide clearance for the armatures. Furthermore, armature 140 has an arm 168 which extends forwardly of the armature and underlies lever 138, on which driving pawl 134 is mounted. Similarly, armature 141 has a forwardly extending arm 169 which underlies lever 139 on which driving pawl 135 is mounted.

A spring bail 170 is mounted on base 140 beneath pivot pin 152 and is connected thereto by means of a plate 170 and a pair of screws 172. Levers 138 and 139 carry flat springs 173 and 174. The free ends of each of springs 173 and 178 extend generally toward each other and are engaged with apertures 175 in the sides of bail 170. When the armatures and levers are in their unactuated positions, springs 173 and 174 are unstressed.

Lever 138 includes a hub 176 on which detent pawl 136 is supported for rotation relative thereto. Lever 138 is coupled to detent pawl 136 in a manner similar to that of the embodiment illustrated in FIG. 16. As shown in FIG. 18, lever 138 includes a portion 177 which abuts a straight edge 178 on detent pawl 137 so that when the lever is moved to its actuated position, portion 177 pushes against edge 178 and moves detent pawl 137 in a clockwise direction away from ratchet wheel 133.

At its upper end, lever 138 supports a pivot pin 179 which extends through driving pawl 134. A torsion spring 180 biases driving pawl 134 in a clockwise direction relative to lever 138 and against a forward lip so that the detent pawl is held in proper position for engagement with a major tooth of ratchet wheel 133 upon actuation of the lever. Lever 139 is coupled to detent pawl 136 and carries driving pawl 135 in a similar manner.

Stop member 154 is provided with a pair of laterally spaced stops 181 and 182 which extend outwardly from the body portion of the stop member and are disposed in the path of movement of driving pawls 134 and 135, respectively, to stop movement of the parts after the ratchet wheel has been rotated through one increment, in a manner similar to that previously described. A pair of interrupter switches 185 and 186 are mounted on base 145 and are actuated in response to movement of levers 138 and 139.

In operation, when electromagnet 143 is energized, it attracts armature 141 and rotates the same about pin 152 in a counterclockwise direction, as viewed in FIG. 18. As the armature rotates, arm 169 rotates lever 139 in a counterclockwise direction so that the driving pawl 135 moves into engagement with the ratchet wheel. Continued rotation of lever 139 moves the driving pawl 135, which then pivots relative to the lever, until the driving pawl engages stop 180, whereupon movement of the parts is stopped. Also, as lever 139 is rotated, it moves spring 174 and stresses the same.

As lever 139 rotates into its actuated position, it disengages detent pawl 136 to allow ratchet wheel 133 to be rotated in the counterclockwise direction, such movement of detent pawl 133 further stressing spring 183 which biases the detent pawls toward engagement with the ratchet wheel.

When electromagnet 143 is de-energized, spring 183 moves detent pawl 136 back into engagement with ratchet wheel 133 and rotates lever 139 in a clockwise direction. Such movement is further aided by the bias of spring 174. As the lever moves in the clockwise direction, it bears against arm 169 of armature 141 and thereby moves the armature away from engagement with the pole of electromagnet 143.

In a similar manner, electromagnet 142 is operative, in response to energization thereof, to rotate ratchet wheel 133 in a clockwise direction.

Where noise is a primary consideration, it may be desirable to construct portions of the stepping motor of a non-metallic material, such as nylon or polytetrafluoroethylene. Since the impact against the stops absorbs the greatest amount of momentum, it produces the most noise. Therefore, by making the stops of a non-metallic material a considerable amount of noise is eliminated. Furthermore, the ratchet wheel itself can be constructed of a non-metallic material, as well as can the driving pawls.

If the driving pawls and ratchet wheel are constructed of a metallic material, such as steel, it has been found that prolonged operation of the device produces small metallic chips or dust which fall toward the pivot pin and increase the friction between armatures or levers and the pivot pins. To prevent this, a cylindrical permanent magnet can be mounted above these elements, as indicated at 184 in FIG. 18, to attract the chips or particles falling from above and prevent them from getting in between the moving parts.

Stepping motors have been constructed in accordance with the foregoing and have been operated at stepping rates of up to about 80 cycles per second without failure of the mechanism. The embodiment of FIGS. 17–19 operates faster than the other embodiments, primarily due to the increased strength of the magnetic field acting on the armatures and because of the added springs for increasing the speed of movement of the levers. Devices constructed in accordance with the other embodiments have been operated at speeds up to 40 cycles per second without failure.

Where a stop member is used, of the type used in the embodiments illustrated in FIGS. 1–10 and 17–19, the stop member can readily be molded. The one-piece structure of the stop member accurately locates the pivotal axes of the ratchet wheel, armatures or levers, and detent pawls and thereby eliminates hand adjustments.

Attention is directed to my copending application, Serial No. 89,244, filed concurrently herewith, claiming the novel pawl and ratchet mechanism embodied in the present invention.

It will be apparent that many changes can be made in the details and arrangement of parts without departing from the scope of the invention as defined in the appended claims.

What is claimed is:

1. A stepping motor comprising an output shaft, a ratchet wheel rigidly affixed thereto for rotating said shaft, driving means for reversibly rotating said ratchet wheel in a step-by-step fashion and including a pair of driving pawls, a pair of detent pawls normally engaged with said ratchet wheel to prevent rotation thereof, a pair of armatures operative to actuate said driving pawls and to disengage said detent pawls, and means including a pair of selectively energizable electromagnets operatively connected for actuating said armatures to rotate said ratchet wheel in response to energization of said electromagnets.

2. A stepping motor comprising an output shaft, a ratchet wheel for rotating said shaft, a pair of driving pawls for reversibly rotating said ratchet wheel, a pair of detent pawls normally engaged with said ratchet wheel to prevent rotation thereof, stop means engageable with said driving pawls so that rotation of said ratchet wheel occurs in a step-by-step manner, a pair of armatures operably connected for actuating said driving pawls and for disengaging said detent pawls, and a pair of electromagnets operatively connected for actuating said armatures to rotate said ratchet wheel in response to energization of said electromagnets.

3. A stepping motor comprising an output shaft, a ratchet wheel operably connected for rotating said shaft, a pair of armatures, means including a pair of selectively energizable electromagnets for actuating said armatures, driving means for reversibly rotating said ratchet wheel in a step-by-step manner and including a pair of pivotally mounted driving pawls each operative, upon actuation of a different one of said armatures, to rotate said ratchet wheel in a different direction, a pair of detent pawls normally engaged with said ratchet wheel to prevent rotation thereof, each of said detent pawls being disengaged from said ratchet wheel, upon actuation of a different one of said driving pawls, to allow rotation of said ratchet wheel.

4. A stepping motor comprising a stepper motor in accordance with claim 3 and including means coupling said armatures and said detent pawls for movement together.

5. A stepping motor comprising a rotatable ratchet wheel, an output shaft mounted for rotation with said ratchet wheel, a pair of armatures, means including a pair of selectively energizable electromagnets for actuating said armatures, a pair of pivotal driving pawls each operative upon actuation of a different one of said armatures to rotate said ratchet wheel in a different direction, stop means arranged in the path of movement of said driving pawls and operative to limit movement of said driving pawls so that said ratchet wheel is moved in steps of equal increments each time one of said electromagnets is energized, a pair of detent pawls normally engaged with said ratchet wheel to prevent rotation thereof, each of said detent pawls being coupled to a different one of said armatures whereby actuation of such armature disengages said detent pawls to allow said ratchet wheel to be rotated.

6. A stepping motor comprising a rotatable ratchet wheel, an output shaft mounted for rotation with said ratchet wheel, a pair of levers each movable between actuated and unactuated positions, a pair of selectively energizable electromagnets each operative upon energization thereof to move a different one of said levers from one of said positions to the other of said positions, a pair of driving pawls each carried by a different one of said levers and operative, upon movement of said lever associated therewith, into said actuated position, to rotate said ratchet wheel in a different direction, a pair of detent pawls engageable with said ratchet wheel to prevent rotation thereof, each of said detent pawls being coupled to a different one of said levers for movement therewith, whereby actuation of said lever disengages the detent pawl associated therewith to allow said ratchet wheel to be rotated, biasing means operatively connected for biasing said detent pawls toward engagement with said ratchet wheel and biasing said levers for movement from said other positions to said one position, and stop means operative to limit movement of said driving pawls so that said ratchet wheel is rotated a predetermined increment each time one of said electromagnets is energized.

7. A stepping motor in accordance with claim 6 wherein each of said electromagnets is operative, upon energization thereof, to move said lever associated therewith from said unactuated position to said actuated position, and said biasing means is operative to move said lever from said actuated position to said unactuated position.

8. A stepping motor comprising a rotatable ratchet wheel, a pair of selectively energizable electromagnets, a pair of levers mounted for rotation about a common axis parallel to the axis of rotation of said ratchet wheel, each of said levers being operatively associated with a different one of said electromagnets for movement in response to energization of such electromagnet, a pair of driving pawls each carried by a different one of said levers for rotating said ratchet wheel, and a pair of detent pawls mounted for rotation about an axis coincident with the axis of rotation of said levers, said detent pawls being engageable with said ratchet wheel to prevent rotation thereof and being disengageable, upon actuation of said driving pawls, to allow rotation of said ratchet wheel.

9. A stepping motor comprising a ratchet wheel mounted for rotation about a first axis, a pair of independently movable levers each mounted for rotation about a second axis parallel to said first axis, driving means including a pair of selectively energizable electromagnets operably connected for selectively moving said levers, a pair of driving pawls each pivotally mounted on a different one of said levers for movement therewith and for rotation relative thereto, each of said driving pawls being engageable with said ratchet wheel, upon actuation of the lever associated therewith, for rotating said ratchet wheel in a different direction, rotation of said ratchet wheel being effective to rotate said driving pawl relative to said lever, and detent pawl means normally engageable with said ratchet wheel and operative, upon actuation of said driving pawls, to allow rotation of said ratchet wheel.

10. A stepping motor in accordance with claim 9 and including stop means mounted in the path of movement of each of said driving pawls for limiting movement thereof so that said ratchet wheel is rotated through a fixed predetermined angle each time one of the driving pawls rotates said ratchet wheel.

11. A stepping motor comprising a ratchet wheel mounted for rotation about a first axis, first and second levers mounted for rotation about a common axis parallel to said first axis, first and second electromagnets operatively connected for actuating said first and second levers respectively, first and second driving pawls carried by said first and second levers respectively for movement therewith, said first driving pawl being engageable with said ratchet wheel, upon actuation of said first lever, to rotate said ratchet wheel in one direction, said second driving pawl being engageable with said ratchet wheel, upon actuation of said second lever, to rotate said ratchet wheel in the other direction, stop means arranged to limit movement of said driving pawls so that said ratchet wheel is rotated through a fixed predetermined angle each time one of said driving pawls is actuated, first and second detent pawls mounted for rotation about said second axis, said detent pawls being engageable with said ratchet wheel for preventing rotation thereof, said detent pawls being further disengageable from said ratchet wheel to allow rotation therewith upon actuation of said first and second driving pawls respectively.

12. A stepping motor comprising a ratchet wheel mounted for rotation about a first axis, a pair of levers mounted for rotation about a second axis parallel to said first axis, each of said levers being disposed on a different side of said ratchet wheel, a pair of electromagnets each associated with a different one of said levers for actuating the same, a pair of driving pawls each disposed on a different side of said ratchet wheel and each being carried by a different one of said levers, one of said driving pawls being operative, upon actuation of the lever associated therewith, to rotate said ratchet wheel in one direction, the other of said driving pawls being operative, upon actuation of the lever associated therewith, to rotate said ratchet wheel in the other direction, a pair of detent pawls mounted for rotation about said second axis, each of said detent pawls being disposed on a different side of said ratchet wheel and being engageable therewith to prevent rotation of said ratchet wheel in a different direction, and coupling means interconnecting each of said detent pawls with a different one of said levers so that actuation of each lever disengages the detent pawl associated therewith to allow rotation of said ratchet wheel.

13. A stepping motor in accordance with claim 12 and including a tension spring connected at opposite ends to said detent pawls and biasing the same toward engagement with said ratchet wheel, said spring being further operative to bias said levers toward unactuated positions.

14. A bidirectional stepping motor capable of high speed operation, comprising
a ratchet wheel operatively mounted for rotation about a fixed axis,
said ratchet wheel having a plurality of major and minor teeth evenly spaced about the periphery thereof with one minor tooth disposed between each adjacent pair of major teeth,
each of said minor teeth having flat side surfaces and an apex and being parallel to said fixed axis, each of the side surfaces of each of said minor teeth lying in a plane passing through the apex of the major tooth adjacent the other side surface of said minor tooth;
first means including a pair of driving pawls operatively arranged for reversibly rotating said ratchet wheel in step-by-step fashion,
each of said driving pawls being mounted for movement toward and away from said ratchet wheel and for pivotal movement about an axis parallel to the fixed axis of rotation of said ratchet wheel;
second means including two selectively energizable electromagnets each operatively arranged to actuate a different one of said driving pawls into driving engagement with said ratchet wheel,
actuation of said driving pawls by said electromagnets causing the actuated driving pawl to rotate said ratchet wheel until the adjacent side surface of the adjacent one of said minor teeth engages the actuated driving pawl; and
stop means disposed to limit pivotal movement of each of said driving pawls about the corresponding one of said axes parallel to said axis of rotation and thereby cause said ratchet wheel to be rotated through a constant predetermined angle each time one of said driving pawls is actuated.

15. A stepping motor comprising a support bracket, a ratchet wheel operatively mounted on said support bracket for rotation about a first axis and having a plurality of major and minor teeth evenly spaced about the periphery thereof, each of said teeth being parallel to said first axis and having flat side surfaces and an apex, each of the side surfaces of each minor tooth lying in the plane which passes through the apex of the major tooth adjacent the other side surface of said minor tooth, first and second levers mounted for independent rotation about a second axis parallel to said first axis, selectively energizable first and second electromagnets operatively connected for actuating said first and second levers respectively, first and second driving pawls pivotally mounted on said first and second levers respectively, said first driving pawl being engageable with said teeth upon actuation of said first electromagnet and said first lever to rotate said ratchet wheel in a forward direction, said second driving pawl being engageable with said teeth upon actuation of said second electromagnet and said second lever to rotate said ratchet wheel in the reverse direction, said ratchet wheel being operative, as it is being rotated, to pivot said driving pawl causing such rotation relative to said lever associated therewith, stop means operative to limit pivotal movement of said driving pawls relative to said levers and thereby cause said ratchet wheel to be rotated through a constant predetermined angle each time one of said driving pawls is actuated, first and second detent pawls mounted for rotation about said second axis toward and away from engagement with said teeth, said first and second detent pawls being operative when engaged with said teeth to prevent rotation of said ratchet wheel in forward and reverse directions respectively, means biasing said detent pawls toward engagement with said ratchet wheel, and means coupling said first and second detent pawls with said first and second levers respectively so that when one of said levers is actuated, said detent pawl coupled thereto is moved away from said ratchet wheel to allow rotation thereof, said biasing means being further operative to bias said levers toward unactuated positions upon de-energization of said electromagnets.

16. A stepping motor in accordance with claim 15 wherein said stop means comprises a stop member mounted adjacent to said ratchet wheel and having a pair of spaced surfaces each engageable with a different one of said driving pawls to limit movement thereof.

17. A stepping motor in accordance with claim 16 wherein said stop member is provided with a pair of parallel bores defining the location of said first and second axes, one of said bores rotatably supporting said output shaft.

18. A stepping motor in accordance with claim 16 wherein said stop member has a pair of spaced guide members each operative to guide a different one of said driving pawls into operative engagement with said ratchet wheel.

19. A stepping motor in accordance with claim 15 wherein each of said levers is provided with a pawl engaging portion spaced from said pivot axis, and means biasing each of said pawls toward engagement with said portions.

20. A stepping motor in accordance with claim 19 wherein each driving pawl has an arm engageable with said lever associated therewith to limit pivotal movement.

21. A stepping motor in accordance with claim 20 wherein said output shaft is tubular, a cylindrical rod extending through said shaft and rotatably supporting the same, and means supporting said rod at at least two spaced portions.

22. A stepping motor in accordance with claim 15 including first and second armatures each movable in response to actuation of a different one of said electromagnets, each of said armatures being engageable with one of said levers to actuate the same.

23. A stepping motor in accordance with claim 15 wherein each of said levers includes a portion of magnetic material attractable by said electromagnet associated therewith for actuating said lever.

24. A stepping motor in accordance with claim 15 and including a T-shaped field member supporting said electromagnet.

References Cited in the file of this patent

UNITED STATES PATENTS

| | | |
|---|---|---|
| 738,012 | Dodge | Sept. 1, 1903 |
| 1,724,825 | Chirol | Aug. 13, 1929 |
| 2,377,583 | Smith | June 5, 1945 |
| 2,627,755 | Hooker | Feb. 10, 1953 |
| 2,914,687 | MacDonald | Nov. 24, 1959 |